(12) United States Patent
Su

(10) Patent No.: US 8,622,865 B2
(45) Date of Patent: Jan. 7, 2014

(54) SPEED CHANGE MECHANISM

(75) Inventor: Hsin Yang Su, Taoyuan County (TW)

(73) Assignee: Sun Race Sturmey-Archer, Inc., Hai-Hu Village, Lu-Ju, Taoyuan County (TW)

( * ) Notice: Subject to any disclaimer, the term of this patent is extended or adjusted under 35 U.S.C. 154(b) by 792 days.

(21) Appl. No.: 12/788,287

(22) Filed: May 26, 2010

(65) Prior Publication Data

US 2010/0304913 A1   Dec. 2, 2010

(30) Foreign Application Priority Data

May 27, 2009 (TW) .............................. 98117607 A
Aug. 10, 2009 (CN) .......................... 2009 1 0163673

(51) Int. Cl.
*F16H 37/06* (2006.01)
*F16H 48/06* (2006.01)
*F16H 3/44* (2006.01)

(52) U.S. Cl.
USPC ............................ 475/151; 475/149; 475/297

(58) Field of Classification Search
None
See application file for complete search history.

(56) References Cited

U.S. PATENT DOCUMENTS

| | | | |
|---|---|---|---|
| 2,659,249 A * | 11/1953 | Carr .............................. | 475/157 |
| 3,481,220 A | 12/1969 | Kaptur | |
| 4,446,757 A | 5/1984 | LaFever | |
| 5,730,232 A * | 3/1998 | Mixer .............................. | 173/176 |
| 5,782,716 A * | 7/1998 | Hukui et al. .................... | 475/149 |
| 5,800,302 A * | 9/1998 | Werre .............................. | 475/1 |
| 6,296,072 B1 * | 10/2001 | Turner ............................ | 180/220 |
| 7,628,727 B2 * | 12/2009 | Nagai et al. .................... | 475/291 |
| 7,935,019 B2 * | 5/2011 | Urabe ............................. | 475/297 |
| 8,226,517 B2 * | 7/2012 | Tsai et al. ...................... | 475/149 |
| 8,460,152 B2 * | 6/2013 | Parsons et al. ................. | 475/283 |
| 2007/0191177 A1 | 8/2007 | Nagai et al. | |
| 2008/0248910 A1 * | 10/2008 | Turvey ............................ | 475/91 |

FOREIGN PATENT DOCUMENTS

| | | |
|---|---|---|
| EP | 2020375 A1 | 4/2009 |
| EP | 2204316 A1 | 7/2010 |
| WO | 2008088169 A1 | 7/2008 |

* cited by examiner

*Primary Examiner* — Troy Chambers
*Assistant Examiner* — Michael Gonzalez
(74) *Attorney, Agent, or Firm* — Barlow, Josephs & Holmes, Ltd.

(57) ABSTRACT

A speed change mechanism 1 includes first and second planetary gear sets 11, 12 enclosed within a sleeve ring 14. A first one-way clutch 141 transmits drive from an output 114 of the first gear set to the sleeve ring and second one-way clutch 142 transmits drive from an output 124 of the second gear set to the sleeve ring, both clutches operating in the same direction. A DC electric motor 2 is coupled to an input 111 of the first gear set to drive its output 114 in the opposite rotary direction to the input. The output 114 of the first gear set is coupled to an input 121 of the second gear set to drive an output 124 of the second gear set in the opposite rotary direction from the output 114 of the first gear set. Drive is transmitted to the sleeve ring 14 either through the first gear set 11 only or through a combination of the first and second gear sets 11, 12 depending on the direction of rotation of the power input to provide two different gear ratios.

25 Claims, 9 Drawing Sheets

SPEED CHANGE MECHANISM

FIELD OF THE INVENTION

The present invention relates to a speed change mechanism or transmission, particularly but not exclusively for a motor.

BACKGROUND OF THE INVENTION

The transmission is a very important part in speed change electric vehicles or electric hand tools. The whole speed change system typically represents about half of the production cost; therefore research on the speed change mechanism is always an important item for any company in the electric vehicle or the electric hand tool industry. A good transmission can change the rotational speed ratio according to different requirements. For use in an eclectic vehicle such as an electric bike, the transmission can be used to change the speed ratio so as to achieve the objective of an appropriate rotational speed or torque for the rider in different conditions.

Planetary gear sets are commonly used in the transmission of an electric vehicle. A planetary internal transmission uses a planetary gear train as the principal part of a speed change mechanism which is typically installed in a gear housing of a rear wheel of the vehicle. A planetary internal transmission achieves different rotational speed ratios by changing the gear ratio of the planetary gear train through different input parts, output parts and fixed parts.

The use of a planetary gear train as the principal part of a speed change mechanism in an internal transmission has the following advantages. First, the volume is small and the structure is precise, and there is little limitation to the narrow installation and usage space of the rear wheel hub. Second, the gearshift process works stably. When used in a vehicle in which the rear wheel is driven by a chain, there is no requirement for the chain to be moved to engage with different chain wheels to change a gear ratio, thus the drawback of chain separation is effectively improved, and the transmission efficiency is increased. Third, the speed change mechanism is protected by the external housing of the wheel hub and is not affected by the external environment, thus the usage lifetime is increased. Fourth, the speed change mechanism is installed inside the wheel hub, and there is not as much noise as an external transmission produces during the gearshift process.

According to the transmission principle of the planetary gear train working as a transmission, the sun gear, planet pinion and ring gear each have a respective gear shaft and these three gears spin around one another. In different gear ratios, one of the three gear shafts is fixed and does not spin, another is a driving shaft, and still another is an output shaft. Different combinations result in different gear ratios needed when reducing, increasing and/or reversing the rotational speed. Six possible combination conditions are shown in Table 1 below.

TABLE 1

Possible configurations of planetary gear set.

| | Combination Condition | | | | | |
|---|---|---|---|---|---|---|
| | 1 | 2 | 3 | 4 | 5 | 6 |
| Sun Gear | Fixed | Output | Fixed | Driving | Output | Driving |
| Planet pinion | Driving | Driving | Output | Output | Fixed | Fixed |
| Ring Gear | Output | Fixed | Driving | Fixed | Driving | Output |

Therefore, the present invention has been developed using the planetary gear train as the core for a speed change mechanism for use especially with wheeled or electric vehicles. Additionally, environmental issues have significantly promoted the use of electric bicycles and vehicles in recent years. Most electric bicycles and vehicles in use today are equipped with internal transmissions. Thus, internal transmissions have gradually become the research key point of large scale vehicle manufacturers.

Whilst the invention has particular application for use with electrically propelled vehicles such as electric bicycles, it should be understood that the invention is not limited to this field but can find applications in other fields where there is a requirement for a speed change mechanism.

SUMMARY OF THE INVENTION

It is an objective to provide a speed change mechanism which overcomes, or at least mitigates, some or all of the limitations of the known speed change mechanisms.

One objective of the present invention is to provide a speed change mechanism composed of a plurality of planetary gear sets and which can be used in combination with a motor having an output that can be driven clockwise and counter-clockwise to achieve the objective of changing the reduction ratio to constitute a multi-stage gearshift and speed change.

In accordance with a first aspect of the invention, there is provided a speed change mechanism, comprising:

a. a first planetary gear set, comprising a first sun gear, a plurality of first planet pinions, a first carrier arm and a first ring gear, wherein one of the first sun gear and the first ring gear comprises a first input and the other of the first sun gear and the first ring gear comprises a first output;

b. a second planetary gear set, comprising a second sun gear, a plurality of second planet pinions, a second carrier arm and a second ring gear, wherein one of the second sun gear and the second ring gear comprises a second input and the other of the second sun gear and the second ring gear comprises a second output;

c. a power input connection for drivingly connecting the first input with an output from a power source and a drive arrangement directly coupling the first output to the second input to transfer drive from the first output to the second input, the first and second planetary gear sets being drivingly coupled so that the first and second outputs are driven in opposite rotary directions;

d. a sleeve ring surrounding the first and second planetary gear sets;

e. a first one-way clutch for transmitting drive from the first output to the sleeve ring in a first rotary direction only; and f. a second one-way clutch for transmitting drive from the second output to the sleeve in the first rotary direction only.

The output sleeve ring may be a hub shell.

The output sleeve ring may comprise a power output. In which case, the speed change mechanism may comprise a hub shell and a third planetary gear operatively connected between the sleeve ring power output and the hub shell to transmit drive from the sleeve ring power output to the hub shell. The third planetary gear set may comprise: a third sun gear, a plurality of third planet pinions, a third carrier arm and a third ring gear, wherein one of the third sun gear, the third planet pinion carrier and the third ring gear is drivingly connected with the power output of the sleeve ring, a first other one of the third sun gear, the third planet pinion carrier and the third ring gear being drivingly coupled to the hub shell to output power to the hub shell. Said first other one of the third sun gear, the third planet pinion carrier and the third ring gear may be drivingly coupled to the hub shell by a third one-way clutch.

The first input may be drivingly connected with a DC electric motor.

The first and second inputs may be the first and second sun gears respectively and the first and second outputs may be the first and second ring gears respectively. Alternatively, the first and second inputs may be the first and second ring gears respectively and the first and second outputs may be the first and second sun gears respectively.

The first and second one way clutches may comprise ratchet devices.

The sleeve ring may have a plurality of ratchet gears formed about its inner surface and each of the first and second outputs may comprise at least one or more ratchet pawls for engagement with the ratchet teeth. Where the first and second ring gears are the first and second outputs, each of the first and second ring gears comprises at least one ratchet pawl arranged for engagement with the ratchet teeth.

The speed change mechanism may have an electric clutch for selectively fixing a second other one of the third sun gear, the third planet pinion carrier and the third ring gear of the third planetary gear set. The electric clutch may comprise a solenoid actuator movable from an un-actuated configuration in which said second other one of the third sun gear, the third planet pinion carrier and the third ring gear of the third planetary gear set is not fixed to an actuated configuration in which said second other one of the third sun gear, the third planet pinion carrier and the third ring gear of the third planetary gear set is fixed in response to a predetermined current being inputted. Where the power input is a DC electric motor, the mechanism may be configured so that a current is inputted to actuate the solenoid to fix said second other one of the third sun gear, the third planet pinion carrier and the third ring gear only when the motor is being driven.

In accordance with a second aspect of the invention, there is provided a speed change mechanism for a motor, comprising:

a. a first planetary gear set, comprising a first sun gear, a plurality of first planet pinions, a first carrier arm and a first ring gear;

b. a second planetary gear set, comprising a second sun gear, a plurality of second planet pinions, a second carrier arm and a second ring gear;

c. a third planetary gear set, comprising a third sun gear, a plurality of third planet pinions, a third carrier arm and a third ring gear; and d. a sleeve ring, the first and second planetary gear sets being located within the sleeve ring and drivingly coupled with the sleeve ring by means of corresponding first and second one-way clutches, the sleeve ring also having a power output;

wherein a power input is connected with one of the first sun gear and the first ring gear to drive the plurality of first planet pinions fixed by the first carrier arm to drive the other of the first sun gear and the first ring gear, the other of the first sun gear and first ring gear being coupled to drive the sleeve ring through the first one-way clutch, the other of the first sun gear and the first ring gear also being coupled with one of the second sun gear and the second ring gear to drive the second planet pinion fixed by the second carrier arm to drive the other of the second sun gear and the second ring gear, the other of the second sun gear and second ring gear being coupled to drive the sleeve ring through the second one-way clutch, while the power output of the sleeve ring is connected with one of the third sun gear, the third planet pinion carrier and the third ring gear and a first other one of the third sun gear, the third planet pinion carrier and the third ring gear is drivingly coupled to a hub shell to output power to the hub shell.

The power input may be a DC electric motor.

The first and second one-way clutches may be operative to transmit drive to the sleeve ring in the same direction. The first and second one-way clutches may be ratchet devices.

The first other one of the third sun gear, the third planet pinion carrier and the third ring gear may be drivingly coupled to the hub shell through a third one-way clutch.

The speed change mechanism may comprises an electric clutch for selectively fixing a second other one of the third sun gear, the third planet pinion carrier and the third ring gear.

The electric clutch may be a normally open solenoid, the solenoid being movable axially to fix said second other one of the third sun gear, the third planet pinion carrier and the third ring gear of the third planetary gear set in response to a predetermined current being inputted.

The mechanism may comprise a control system operative to actuate the solenoid to fix said second other one of the third sun gear, the third planet pinion carrier and the third ring gear of the third planetary gear set only when the motor is being driven.

In accordance with a third aspect of the invention, there is provided a method of operating a speed change mechanism in accordance with the first aspect, the method comprising driving the first input in a first rotary direction so as to transfer drive to the sleeve ring from one of the first and second outputs through its respective one-way clutch to achieve a first speed change ratio and subsequently driving the first input in the opposite rotary direction so as to transfer drive to the sleeve ring from the other of the first and second outputs through its respective one-way clutch to achieve a second speed change ratio.

Where the power input is a DC electric motor, the step of changing the direction in which the first input is driven may be carried out by reversing the polarity of a current supplied to the electric motor.

BRIEF DESCRIPTION OF THE DRAWINGS

Several embodiments of the invention will now be described by way of example only, with reference to the following drawings, in which.

DETAILED DESCRIPTION OF THE PREFERRED EMBODIMENT

Figure 1:
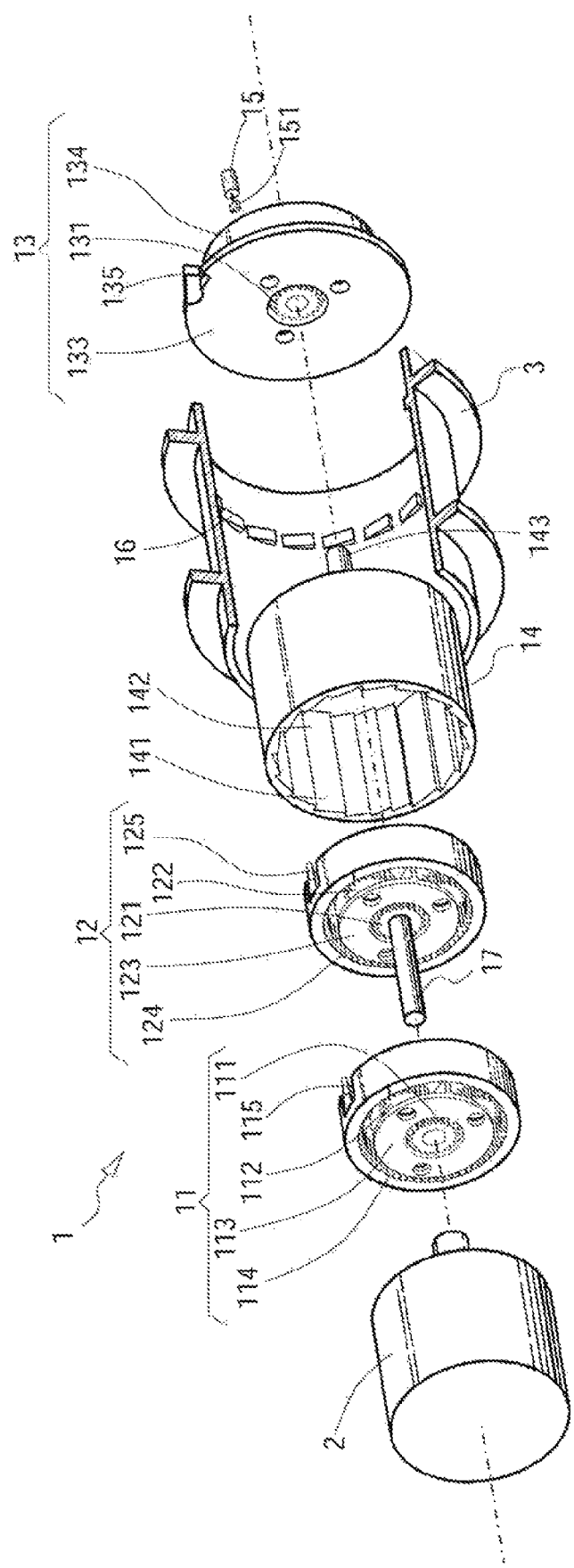
FIG. 1 is an exploded, perspective schematic drawing showing a motor speed change mechanism in accordance with a first embodiment of the present invention.

Various aspects of a motor speed change mechanism in accordance with the present invention will become apparent in the following detailed description of preferred embodiments with reference to the accompanying drawings.

In the following description, the same reference numerals will be used to denote the same features or features that perform the same basic function in each of the embodiments described.

With reference initially to FIG. 1, a speed change mechanism 1 comprises: a power input 2, a first planetary gear set 11, a second planetary gear set 12, a third planetary gear set 13, a sleeve ring 14, and an electric clutch 15.

The first planetary gear set 11 further comprises: a first sun gear 111, a plurality of first planet pinions 112, a first carrier arm 113 and a first ring gear 114. The second planetary gear set 12 further comprises: a second sun gear 121, a plurality of second planet pinions 122, a second carrier arm 123 and a second ring gear 124. The third planetary gear set 13 comprises: a third sun gear 131, a plurality of third planet pinions 132, a third carrier arm 133 and a third ring gear 134.

The first planetary gear set 11, the second planetary gear set 12 and the third planetary set 13 are so-called planetary gears sets which can also referred to as an "Epicyclic Gear Reducer" or "Planetary Gear Reducer" on the market where used to effect a speed reduction. In the above-mentioned planetary gear reducer mechanism, the gear at the centre is called the "sun gear", which refers to the first, the second and the third sun gears 111, 121 and 131. The outermost gear is called the "ring gear", which refers to the first, the second and the third ring gears 114, 124 and 134. Gears that rotate around the first, the second and the third sun gears 111, 121 and 131 respectively are called the "planet pinions", which refer to the first, the second and the third planet pinions 112, 122 and 132.

The first, the second and the third planet pinions 112, 122 and 132 of the first, the second and the third planetary gear sets 11, 12 and 13 are typically arranged in groups of three of four. In the embodiment shown in FIG. 1, each of the gear sets has three planet pinions 112, 122, 132, but the number of planet pinions can be varied as desired in any particular application. Carrier arms namely the first, the second and the third carrier arms 113, 123 and 133 keep the first, the second and the third planet pinions 112, 122 and 132 respectively in positions relative to one another. When the first, the second and the third sun gears 111, 121 and 131 rotate and engage respectively with the first, the second and the third planet pinions 112, 122 and 132, the rotational directions of the two are different. However, when the first, the second and the third ring gears 114, 124 and 134 rotate and engage respectively with the first, the second and the third planet pinions 112, 122 and 132, rotational directions of the two are the same.

The sleeve ring 14 encircles the first and second planetary gear sets 11, 12 and incorporates a power output connection 143. The first and second ring gears 114, 124 are drivingly coupled with the sleeve ring 14 via respective first and second one-way clutch mechanisms 141, 115, 142, 125 so that drive can only be transmitted from either of the first and second ring gears 114, 124 to the sleeve ring 14 when the respective ring gear 114, 124 is rotating in a first rotary direction (clockwise as shown). The power output connection 143 is coupled with the third sun gear 131 of the third planetary gear set 13.

Each of the first and second one-way clutches comprises an array of ratchet teeth 141, 142 formed about the inner circumference of the sleeve ring 14 and a ratchet pawl 115, 125 located on the outer diameter of the respective ring gear 114, 124 for engagement with the ratchet teeth. Since both one-way clutches are operative in the same direction, the ratchet teeth 141, 142 can be formed as single array in a Monocoque type construction as shown for ease of manufacture. However, two separate arrays of teeth could be provided. The ratchet pawls 115, 125 are sprung loaded to protrude from the outer diameter of their respective ring gear 114, 124 so as to engage with a steep face of one of the ratchet teeth to transmit drive to the sleeve ring 14 when the respective ring gear 114, 124 is rotated in a first direction only (clockwise as shown). When a ring gear 114, 124 is rotated in the opposite direction (counter-clockwise as shown), its pawl 115, 125 rides over the shallow faces of the ratchet teeth 141, 142 and is depressed into the ring gear against the spring bias so that no drive is transmitted. Each ring gear 114, 124 can have more than one ratchet pawl 115, 125 if desired.

The first and the second one-way clutch mechanisms in the present embodiment are ratchets or ratchet devices that are operative in the same direction but any suitable one way clutch arrangements can be adopted.

The first sun gear 111 of the first planetary gear set 11 is drivingly coupled with the power input 2, and the ring gear 114 of the first planetary gear set 11 is drivingly coupled with the second sun gear 121 of the second planetary gear set 12. When the power input 2 drives the first planetary gear set 11 inside the sleeve ring 14, one of the first planetary gear set 11 or the second planetary gear set 12 drives the sleeve ring 14 to rotate clockwise through the first one-way clutch 141 or the second one-way clutch 142.

The third carrier arm 133 of the third planetary gear set 13 is connected with a hub shell 3 through a third one-way clutch 16, 135. The hub shell 3 is typically part of a driving wheel of a vehicle. The third one way clutch is similar to first and second one-way clutches and comprises an array of ratchet teeth 16 formed about the inner surface of the hub sleeve 3 and a sprung loaded ratchet pawl 135 on an outer periphery of the third carrier arm 133 which co-operates with the ratchet teeth 16 to transmit drive from the third carrier 133 arm to the hub sleeve 3 only when the third carrier arm is rotating in a first direction, which is clockwise as shown in FIG. 1. However, any suitable one-way clutch arrangement can be used to transmit drive from the third carrier arm 133 to the hub sleeve 3.

The electric clutch 15 is operative to fix the third ring gear to prevent it from rotating and is arranged to operate synchronously with the power input 2. The electric clutch may be a solenoid having an actuation rod which is normally biased to a retracted or open position when no power is supplied. When a current is supplied to actuate the solenoid, the rod is moved axially to an extended position. A block 151 is attached to the rod and engages with the third ring gear 134 when the solenoid rod is extended to fix the third ring gear and prevent it from rotating. When the solenoid is not actuated and the rod is retracted, the block 151 does not engage with the third ring gear is free to rotate. It will be appreciated that the direction of movement of the solenoid could be reversed.

A current to actuate the solenoid and fix the third ring gear is supplied when the power input 2 is operative to power the speed change mechanism but is not supplied when the power input is not driving the transmission. Where the power input 2 is a DC electric motor, the solenoid may be connected in a circuit with the motor so that a current is inputted to actuate the solenoid whenever the motor is supplied with current to drive the transmission. Alternatively, the solenoid may be actuated by a control system configured to detect when the power input 2 is driving the speed change mechanism. Because the electric clutch 15 is an off-the-shelf part and is not the key point of the present invention, unnecessary detail is not given here.

In the preferred embodiment of the present invention, the power input 2 can be a DC electric motor. By changing the positive and negative electrode direction of the input current, the DC electric motor can be arranged to drive the sun gear 111 of the first planetary gear set 11 to rotate clockwise or counter-clockwise. The power input 2 simultaneously engages the electric clutch 15 when in operation to fix the third ring gear 134. When the operation of the power input 2 stops, the electric clutch 15 releases the third ring gear 134 so that the third ring gear 134 can rotate freely, so as to prevent the third carrier arm 133 connected with the hub shell 3 from causing gears inside the third planetary gear set 13 to get stuck due to counter-clockwise rotation. This allows the hub shell to be rotated in either direction relative to the ring sleeve 14 when the power input 2 is not driving the speed change mechanism.

Regardless of whether the power input 2 (DC electric motor) rotates the first sun gear clockwise or counter-clockwise, the sleeve ring 14 is always driven to rotate in the same direction (clockwise as shown) through either the first planetary gear set 11 or the second planetary gear set 12, and further drives the third carrier arm 133 of the third planetary gear set 13 to drive the hub shell 3 at a reduced rotational speed in comparison to the rotational speed of the power input. The hub shell 3 is also always driven in the same direction regardless of the direction of rotation of the power input.

Figure 2:
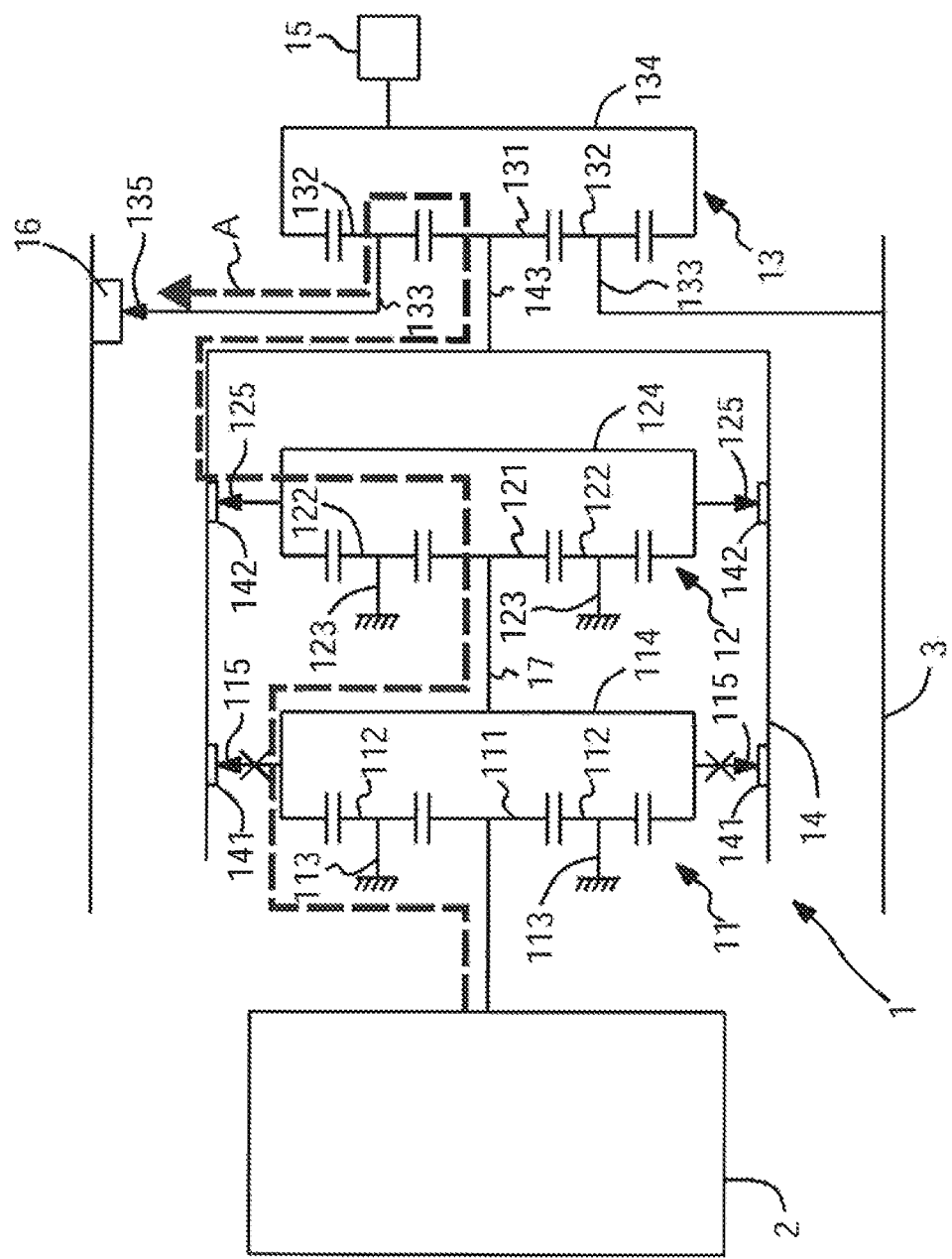
FIG. 2 is a schematic drawing illustrating a first speed reduction mode of the motor speed change mechanism of FIG. 1.

Please refer to FIG. 2, which is the schematic drawing illustrating a first speed reduction mode of the speed change mechanism of the present invention. The dashed line A in FIG. 2 represents the power transmission path through the speed change mechanism from the power input terminal 2 when operated in the first speed reduction mode.

When the power input terminal 2 (DC electric motor) rotates clockwise (symbol "+" represents clockwise rotation and symbol "−" represents counter-clockwise rotation in the following drawing) it drives the first sun gear 111 of the first planetary gear set 11 to rotate clockwise and the first planet pinions 112 engaged with the first sun gear 111 are driven to rotated in the opposite direction (rotates counter-clockwise).

Because the first carrier arm 113 is fixed, according to the transmission principle of planetary gear sets, the power outputted from the first sun gear 111 is transmitted to the first ring gear 114 through the first planet pinions 112, due to the engagement of the first ring gear 114 and the first planet pinions 112. As a result, the first ring gear 114 and the first planet pinions 112 are both driven counter-clockwise (rotate counter-clockwise).

Because the first ring gear 114 is rotating counter-clockwise, the pawl 115 disposed outside the first ring gear 114 cannot drivingly engage with the ratchet teeth 141 inside the sleeve ring 14 so that the first one-way clutch idles (the symbol "x" represents ineffective power transmission), that is to say, power from the first planetary gear set 11 cannot be transmitted to the sleeve ring 14 through the first one-way clutch 115, 141. The first ring gear 114 is connected coaxially with the second sun gear 121 of the second planetary gear set 12 through a coaxial shaft 17 (please refer to FIG. 1), so that the second sun gear 121 is driven to rotate counter-clockwise in the same direction as the first ring gear. Thus drive from the power input 2 is transmitted directly to the second planetary gear set 12 through the first planetary gear set 11 after a first speed reduction step.

Power from the second sun gear 121, which is rotating counter-clockwise, is transmitted to the second planet pinions 122 which are driven in the opposite direction to the second sun gear to rotate clockwise. Because the second planet pinions 122 are fixed through the second carrier arm 123, according to the transmission principle of planetary gears, drive from the second sun gear 121 is transmitted to the second ring gear 124 through the second planet pinions 122, due to the engagement of the second ring gear 124 and the second planet pinions 122. Therefore, the second ring gear 124 and the second planet pinion 122 are both driven to rotate clockwise.

With the second ring gear 124 rotating in a clockwise direction, the second ratchet pawl 125 disposed outside the second ring gear 124 engages the steep face of one of the ratchet teeth 142 inside the sleeve ring 14 to transmit drive to the sleeve ring and rotate the sleeve ring in a clockwise direction. That is to say, power from the second planetary gear set 12 is transmitted to the sleeve ring 14 through the second one-way clutch 125, 142. The resultant rotational movement of the sleeve ring 14 is transmitted to the third sun gear 131 of the third planetary gear set 13 through the power output shaft 143. With the electronic clutch 15 engaged to fix the third ring gear 134, the third carrier arm 133 of the third planetary gear set 13 is caused to rotate clockwise (i.e. in the same direction as the third sun gear) and drive is transmitted to the hub shell 3 through the third one-way clutch 16 so that the hub shell 3 is driven in the same direction as the sleeve ring (clockwise as shown in FIG. 1).

In the first speed reduction mode, drive is transmitted from the power input through the first planetary gear set 11 to the second planetary gear set 12 and through the secondary planetary gear set 12 to the sleeve ring 14 and thus undergoes a two stage speed reduction from the power input to the sleeve ring 14. The drive is then transmitted from the sleeve ring 14 to the hub shell 3 through the third planetary gear set 13 where it undergoes a further speed reduction.

For example, in the present embodiment of the present invention, the rotational speed of the power input terminal 2 (DC motor) is 4000 rpm (revolutions per minute), and the gear teeth numbers of the first, the second and the third planetary gear sets 11, 12 and 13 are as shown below:

The gear teeth number of the first, the second and the third sun gears 111, 121 and 131 is 25;

the gear teeth number of the first, the second and the third planet pinions 112, 122 and 132 is 26; and the gear teeth number of the first, the second and the third ring gears 114, 124 and 134 is 77.

After calculation based on the above data, the gear reduction ratios of the first and the second planetary gear sets 11 and 12 are 3.08 respectively, and the gear reduction ratio of the third planetary gear set 13 is 4.08.

In the first speed reduction mode of the speed change mechanism 1 of the present invention, the power input 2 (DC motor) rotates clockwise to drive the hub shell 3 with high torque and low rotational speed wherein the output rotational speed rpm of the hub shell 3 can be calculated as below:

3.08×3.08×4.08=38.7[the gear reduction ratio accumulated after the first, the second and the third planetary gear sets]

4000(rpm)[rotational speed of the power input terminal]÷38.7=103.35(rpm)[rotational speed of the hub]

Thereby, in the first speed reduction mode, the original 4000 rpm output of the power input 2 (DC motor) reduces to 103.35 rpm through the motor speed change mechanism 1 and outputs to the hub shell 3, to achieve the objective of low rotational speed and high torque.

Figure 3:
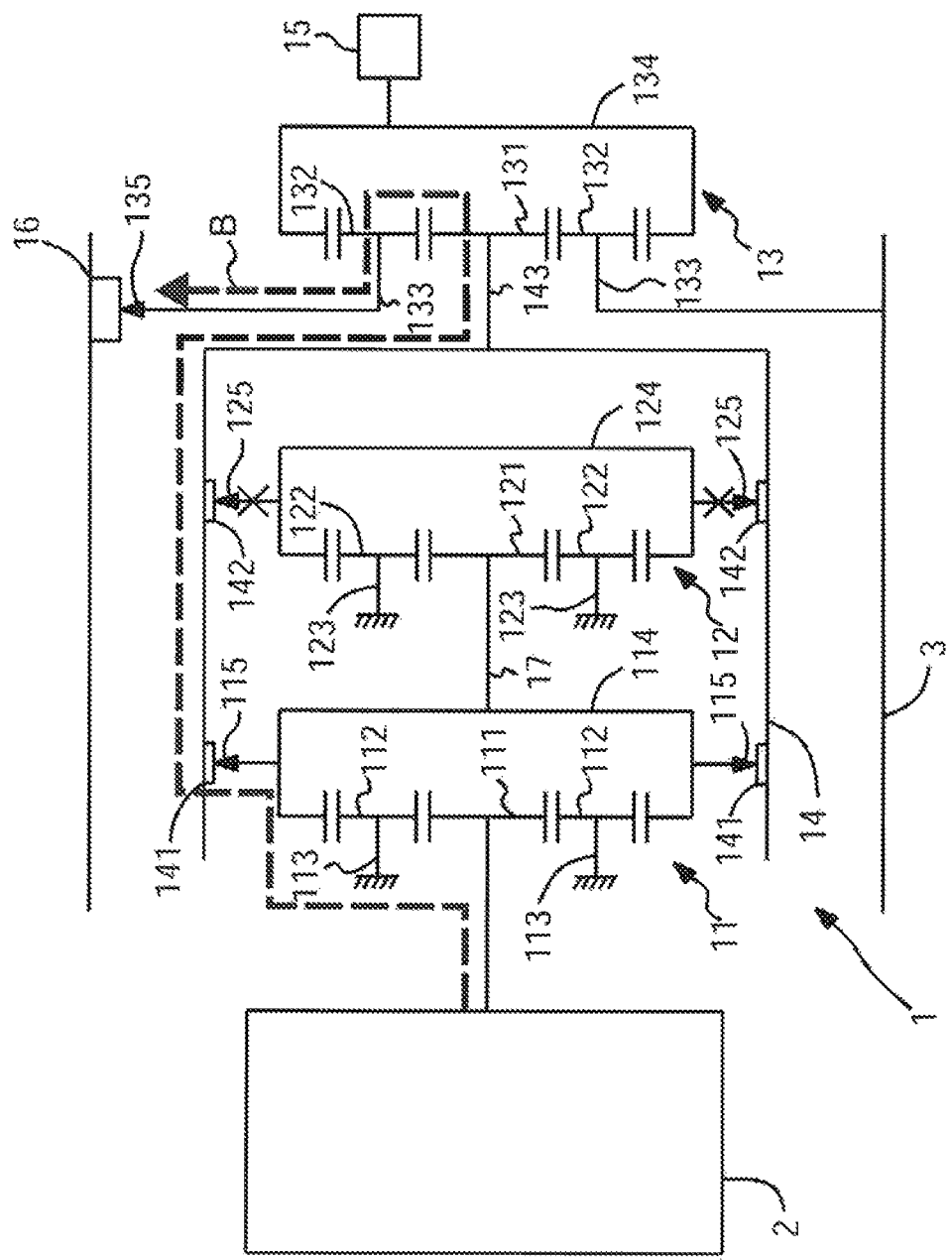
FIG. 3 is a schematic drawing illustrating a second speed reduction mode of the motor speed change mechanism of FIG. 1.

Please refer to FIG. 3, which is the schematic drawing showing a second speed reduction mode of the speed change mechanism of the present invention, wherein the dashed line B in FIG. 2 represents the power transmission path through the mechanism in the second deceleration mode. In the second speed reduction mode, the power input 2 namely the DC motor operates counter-clockwise (rotates counter-clockwise) and outputs power (symbol "+" represents clockwise rotation and symbol "−" represents counter-clockwise rotation in the following drawing) to the first sun gear 111 of the first planetary gear set 11 which is driven to rotate counter-clockwise, while the first planet pinions 112 engaged with the first sun gear 111 are driven to rotate clockwise Because the first carrier arm 113 is fixed, according to the transmission principle of planetary gears, the power outputted from the first sun gear 111 is transmitted to the first ring gear 114 through the first planet pinions 112, due to the engagement of the first ring gear 114 and the first planet pinions 112. Therefore, the first ring gear 114 and the first planet pinion 112 are both driven to rotate clockwise.

With the first ring gear 114 rotating in a clockwise direction, the first ratchet pawl 115 engages with the steep face of one of the ratchet teeth 141 inside the sleeve ring 14 to drive the sleeve ring in a clockwise direction (rotate clockwise). Accordingly, power from the input 2 is transferred to the sleeve ring 14 from the first planetary gear set 11 only through the first one-way clutch 115, 141.

The first ring gear 114 is coupled with the second sun gear 121 of the second planetary gear set 12 through the coaxial shaft 17, so that the second sun gear 121 is driven to rotate in the same direction (clockwise as shown) as the first ring gear. Further, because the second carrier arm 123 is fixed, according to the transmission principle of planetary gears, the power outputted from the second sun gear 121 is transmitted to the second ring gear 124 through the second planet pinions 122, due to the engagement of the second ring gear 124 and the second planet pinion 122. Therefore, the second ring gear 124 and the second planet pinion 122 are both driven to rotate counter-clockwise.

With the second ring gear 124 rotating in a counter-clockwise direction, the second ratchet pawl 125 is unable to drivingly engage the ratchet teeth 142 inside the sleeve ring 14, so that the second one-way clutch 125, 142 idles (the symbol "x" represents ineffective power transmission). That is to say no power is transmitted to the sleeve ring through the second planetary gear set 12 through the second one-way clutch 125, 142.

Thus in the second speed reduction mode, drive is transmitted to the sleeve ring 14 through the first planetary gear set 11 only and so undergoes only a single stage speed reduction from the input to the sleeve ring. Drive is then transmitted from the sleeve ring 14 to the hub shell 3 through the third planetary gear set 13 and the third one-way clutch 16, where it undergoes a further speed reduction.

In the second speed reduction mode of the speed change mechanism 1 of the present invention, the power input 2 (DC motor) is provided with a 4000 rpm counter-clockwise input. Reduction ratios of the first, the second and the third planetary gear sets 11, 12 and 13 are the same as those in the first speed reduction mode. The power input 2 (DC motor) rotates counter-clockwise (as shown) to drive the hub shell 3 with high torque and low rotational speed wherein the output rotational speed rpm of the hub shell 3 can be calculated as below:

$$3.08 \times 4.08 = 12.57 \text{[the gear reduction ratio accumulated after the first and the third planetary gear sets]}$$

$$4000 \text{(rpm)[rotational speed of the power input terminal]} \div 12.57 = 318.22 \text{(rpm)[rotational speed of the hub]}$$

Thereby, in the second speed reduction mode, the original 4000 rpm output of the power input 2 (DC motor) reduces to 318.22 rpm through the motor speed change mechanism 1 and outputs to the hub shell 3, to achieve the objective of high rotational speed and low torque.

It can be seen then that the motor speed change mechanism 1 of the present invention, different speed change ratios are achieved by changing the direction of rotation of the power input 2. The appropriate gear (speed change mode) is chosen according to different requirements needed in use of an electric vehicle for starting, climbing and cruising, so that the power input 2 can have more efficient performance.

Effecting a gear change by changing the direction of rotation of the power input 2 through the first, the second and the third planetary gear sets 11, 12 and 13, is advantageous in that there is no friction generated as is the case with conventional gear box arrangements where it is necessary to actuate a clutch or switch the power path when changing gear. Accordingly, losses due to friction through transmission are reduced, and easy gear selection is provided for users.

In summary, the motor speed change mechanism 1 of the present invention uses a control system to change the positive and negative electrodes of the input current to the power input (DC motor), so as to change the power input 2 to rotate either clockwise or counter-clockwise. Depending on the direction of rotation of the power input 2, the motor speed change mechanism 1 provides either a first or a second speed change mode to provide different gear ratios to vary the output speed and torque at the hub.

Figure 4:
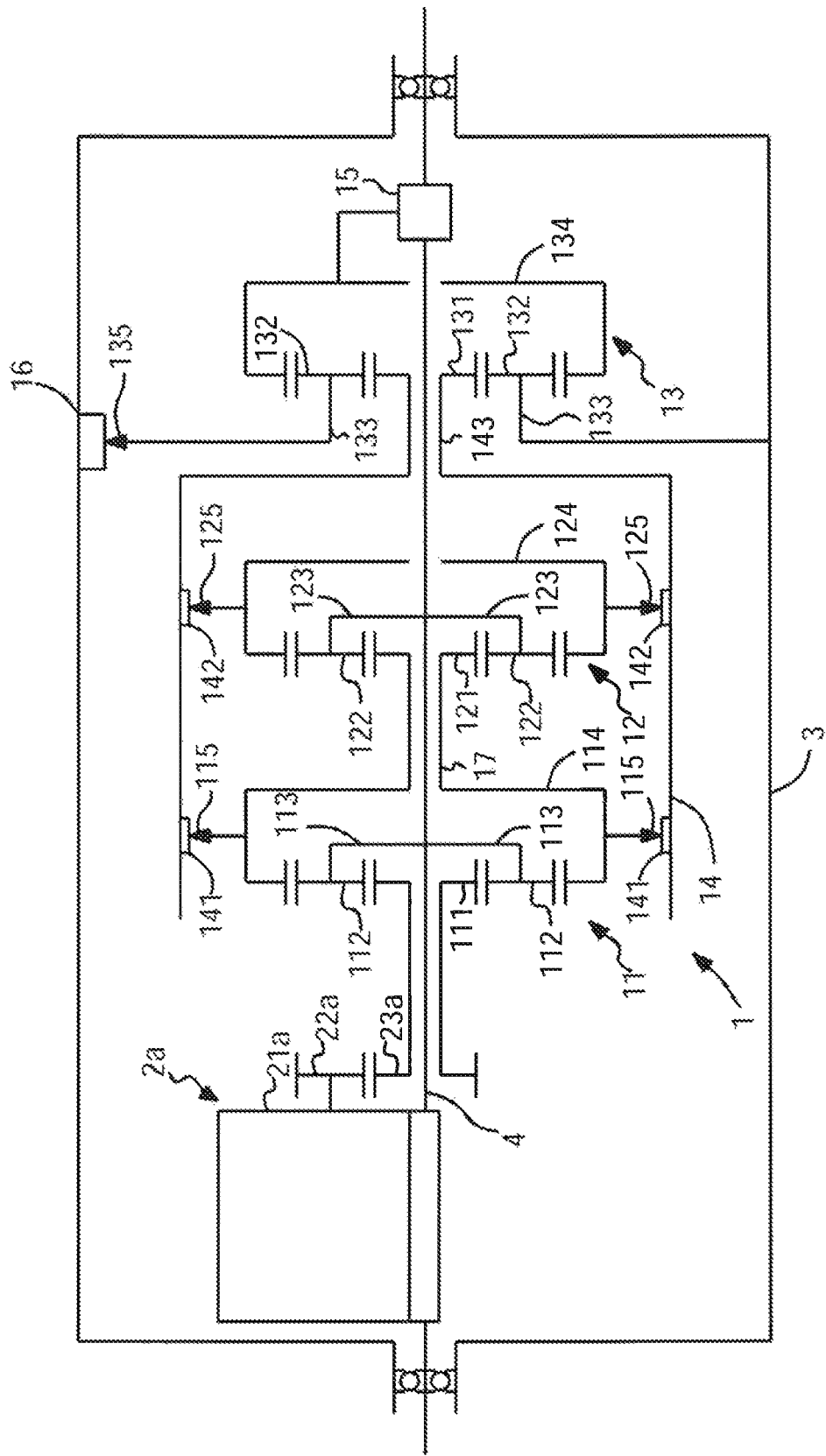
FIG. 4 is a schematic drawing illustrating a motor speed change mechanism in accordance with a second embodiment of the present invention.

FIG. 4 illustrates schematically a second embodiment of a speed change mechanism 1 in accordance with the present invention. The mechanism 1 of the second embodiment is essentially the same as that of the first embodiment and so only the differences will be described in detail. In all other respects, the second embodiment is constructed and operates in the same manner as the first embodiment and the reader should refer to the above description of the first embodiment for details.

In the second embodiment, the output shaft of the power input 2a, which is a DC motor, is offset from the axis of rotation of the first, second and third planetary gear sets 11, 12, 13. The motor 2a has a main body casing 21a and is mounted inside the hub shell 3 to a central shaft or axle 4. The motor has an internal rotor and drive is transmitted from the rotor to the first sun gear 111 through a driving gear 22a and a driven gear 23a.

The driven gear 23a, the first, the second and the third sun gears 111, 121 and 131, and the power output shaft 143 of the sleeve ring 14 are all mounted co-axially for rotation about the central shaft 4. The internal rotor of the motor and the driving gear 22a are coaxially connected and drive the driven gear 23a which is engaged with the driving gear 22a. The driven gear 23a is coaxially connected to the first sun gear 111 of the first planetary gear set 11 to transmit drive from the motor the speed change mechanism to drive the hub shell 3 to rotate.

The driving gear 22a and the driven gear 23a may provide a ratio of 1:1 or they may be arranged to provide an additional speed change ratio. Alternatively, power input 2a can drive the sun gear 111 by means of a drive belt or chain so that the first sun gear 111.

Offsetting the power input 2 as illustrated in FIG. 4 may be required for packaging reasons of to allow the use of an internal rotor motor which cannot be positioned co-axially with the planetary gear sets within the hub shell 3 of a wheeled vehicle.

Figure 5:
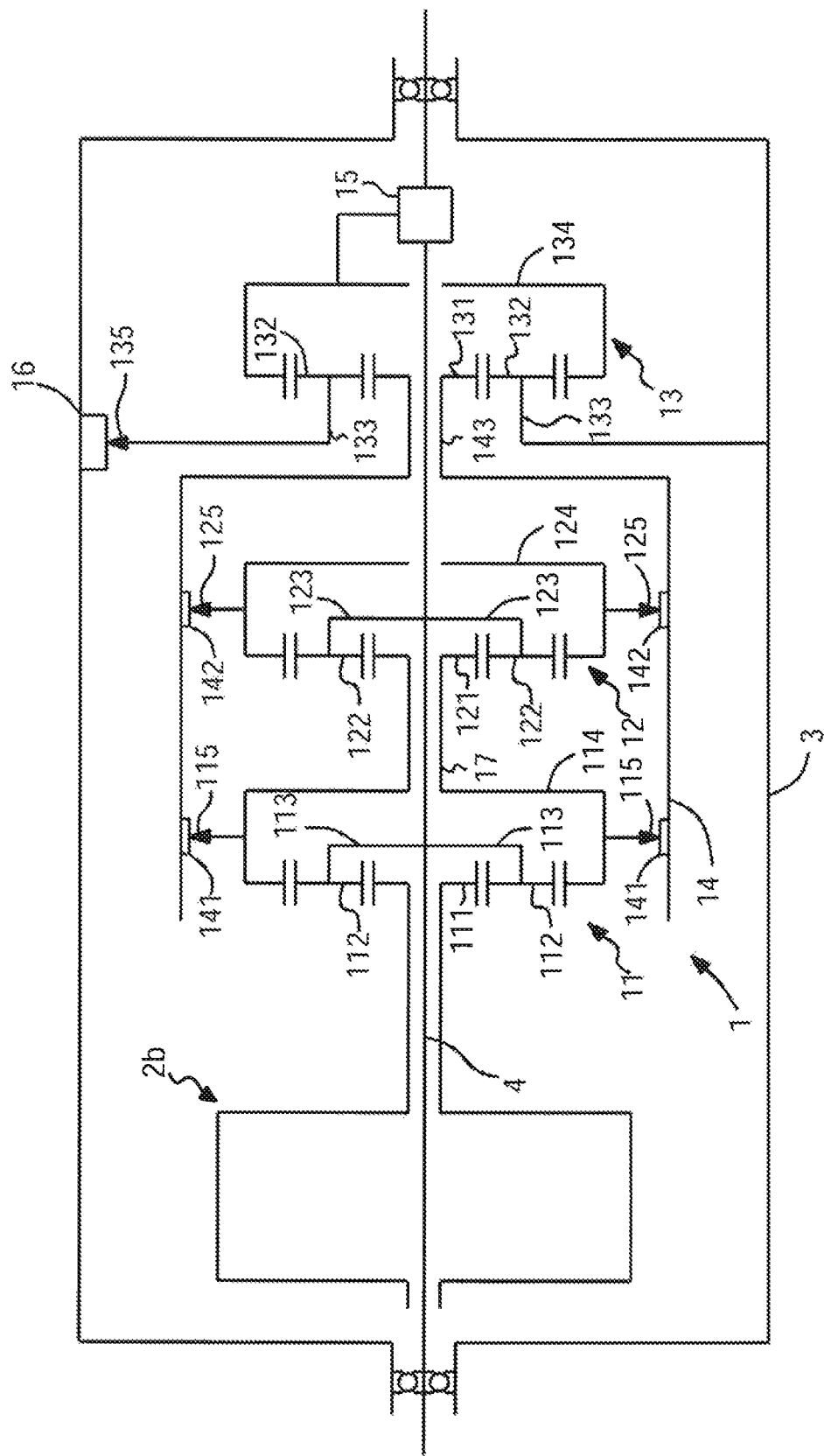
FIG. 5 is a schematic drawing illustrating a motor speed change mechanism in accordance with a third embodiment of the present invention.

FIG. 5 illustrates schematically a third embodiment of a speed change mechanism 1 in accordance with the present invention. The mechanism 1 of the third embodiment is essentially the same as that of the first embodiment and so only the differences will be described in detail. In all other respects, the third embodiment is constructed and operates in the same manner as the first embodiment and the reader should refer to the above description of the first embodiment for details.

In the third embodiment, the power input 2b is an exterior-rotor DC motor of a known type. The advantage of using an exterior-rotor DC motor is that the motor can be positioned within the hub shell 3 of a wheel co-axially with the first, second and third planetary gear sets 11, 12, 13 about a central shaft 4 such as an axle.

Figure 6:
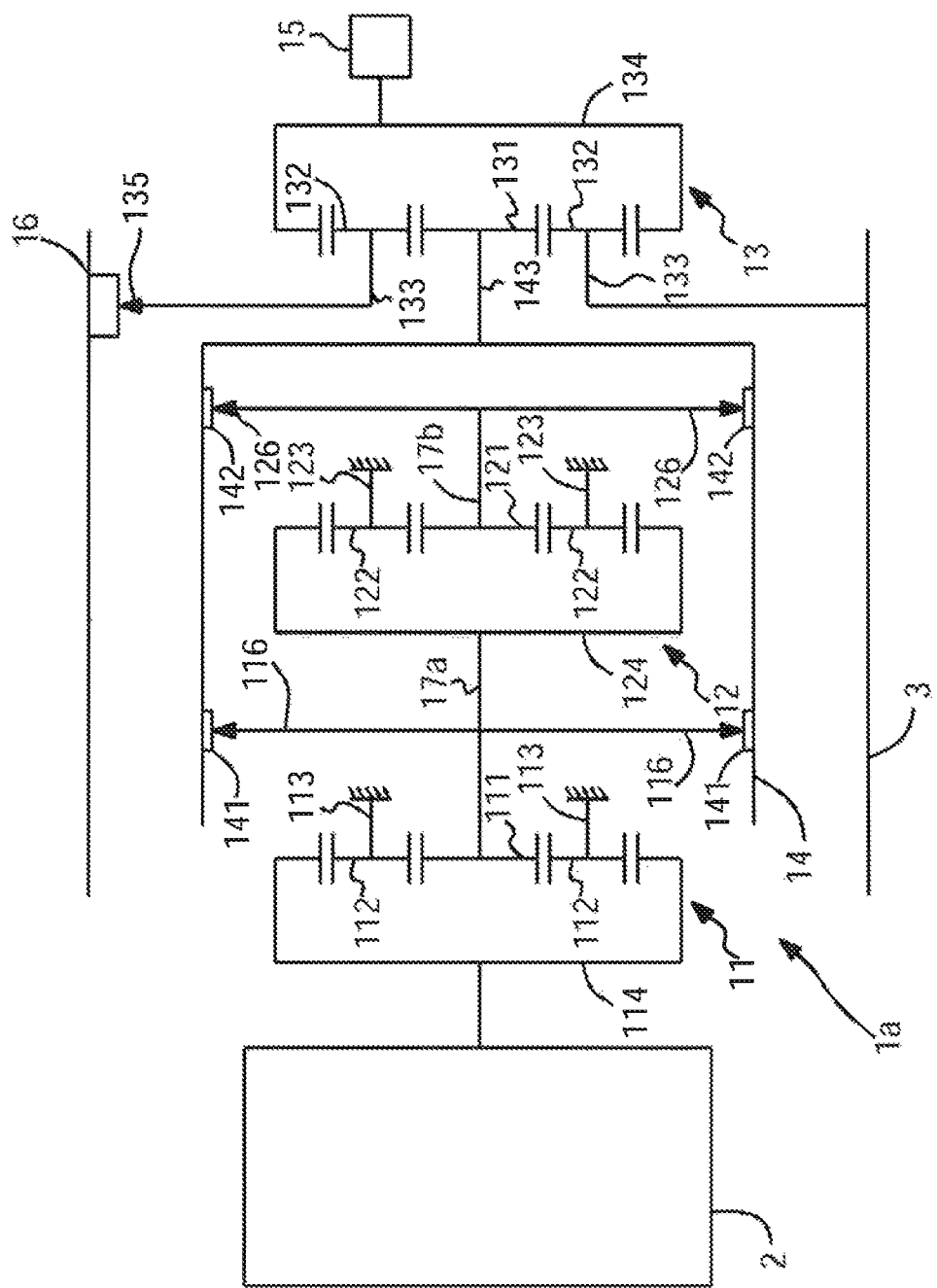
FIG. 6 is a schematic drawing illustrating a motor speed change mechanism in accordance with a fourth embodiment of the present invention.

FIG. 6 illustrates schematically a fourth embodiment of a speed change mechanism 1a in accordance with the present invention. The mechanism 1a of the fourth embodiment is essentially the same as that of the first embodiment and so only the differences will be described in detail. In all other respects, the fourth embodiment is constructed and operates in the same manner as the first embodiment and the reader should refer to the above description of the first embodiment for details.

In the previous embodiments, drive is input into each of the first and second planetary gear sets 11, 12 through their respective first and second sun gears and is output by their respective first and second ring gears 114, 124 to achieve a speed reduction through each of the first and second planetary gear sets 11, 12. Thus in the previous embodiments, the first and second sun gears 111, 121 can be considered first and second inputs for the first and second planetary gear sets and the first and second ring gears 114, 124 can be considered as first and second outputs. In the fourth embodiment, the inputs and outputs of the first and second planetary gear sets 11, 12 are reversed so that the first and second ring gears 114, 124 become the first and second inputs and the first and second sun gears 111, 121 become the first and second outputs.

In the fourth embodiment as shown in FIG. 6, the power input 2 is coupled with the first ring gear 114. As the first carrier arm 113 is locked, drive is transmitted from the first ring gear 114 through the first planet pinions 112 to the first sun gear 111, which is driven in the opposite rotational direction than the first ring gear 114. A co-axial shaft 17a couples the first sun gear 111 to the second ring gear 124 and is drivingly coupled to the sleeve ring 14 through a first clutch plate 116 fixed to the shaft 17a. The first clutch plate co-operates with the first one-way clutch 141 to transmit drive to the sleeve ring 14 only when it is rotated in a first direction (clockwise as shown).

The second ring gear 124 is driven in the same rotary direction as the first sun gear 111 by the shaft 17a. As the second carrier arm 123 is locked, drive from the second ring gear 124 is transmitted to the second sun gear 121 through the second planet pinions 122 so that the second sun gear 121 is driven in the opposite direction to the second ring gear 124 and the first sun gear 111. A second clutch plate 126 is fixed to a further coaxial shaft 17b coupled to the second sun gear 124. The second clutch plate 126 co-operates with the second one-way clutch 142 to transmit drive to the sleeve ring 14 only when it is rotated in a first direction (clockwise as shown).

Figure 7:
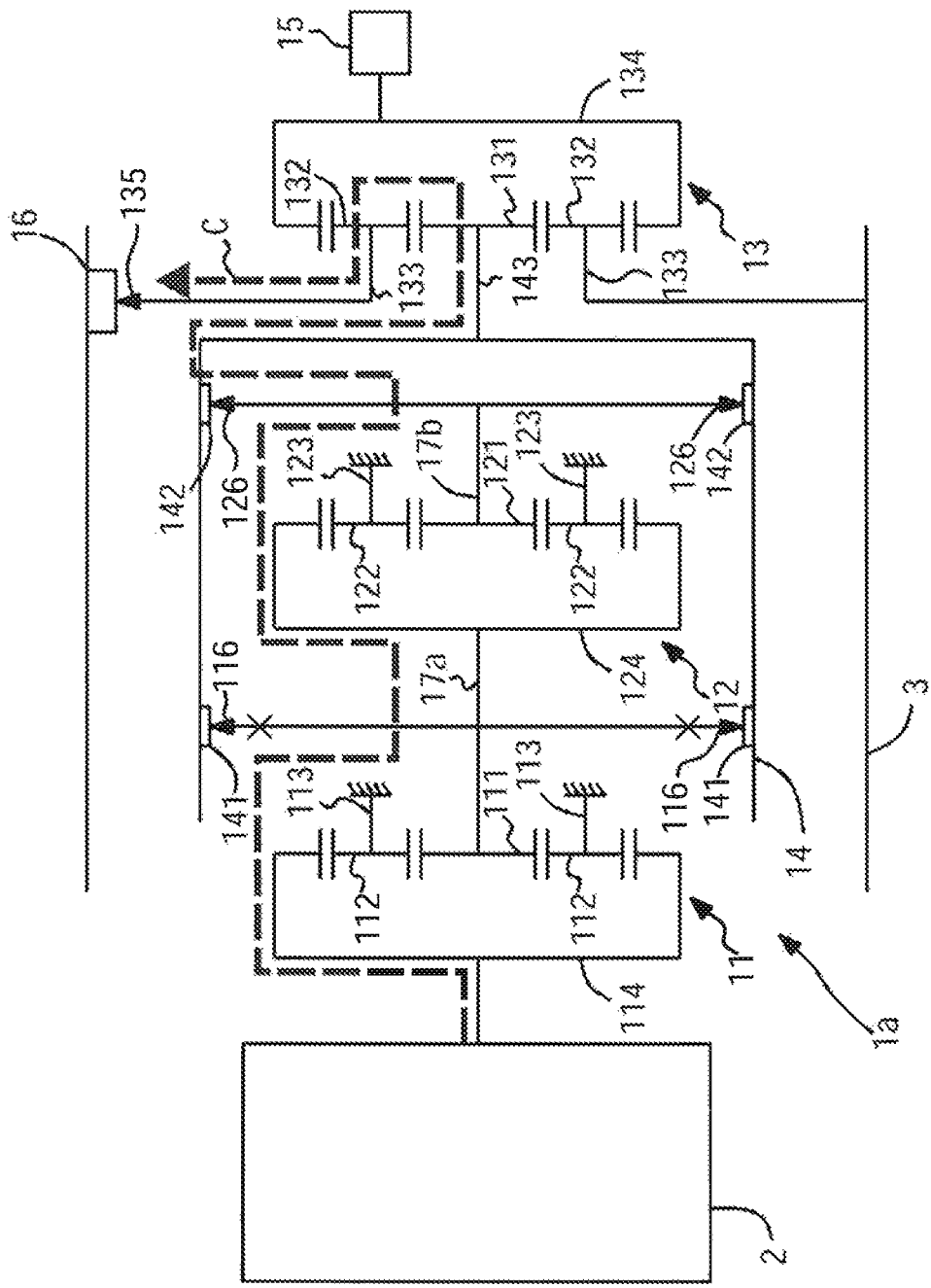
FIG. 7 is a schematic drawing illustrating a first speed increase mode of the motor speed change mechanism of FIG. 6.
Figure 8:
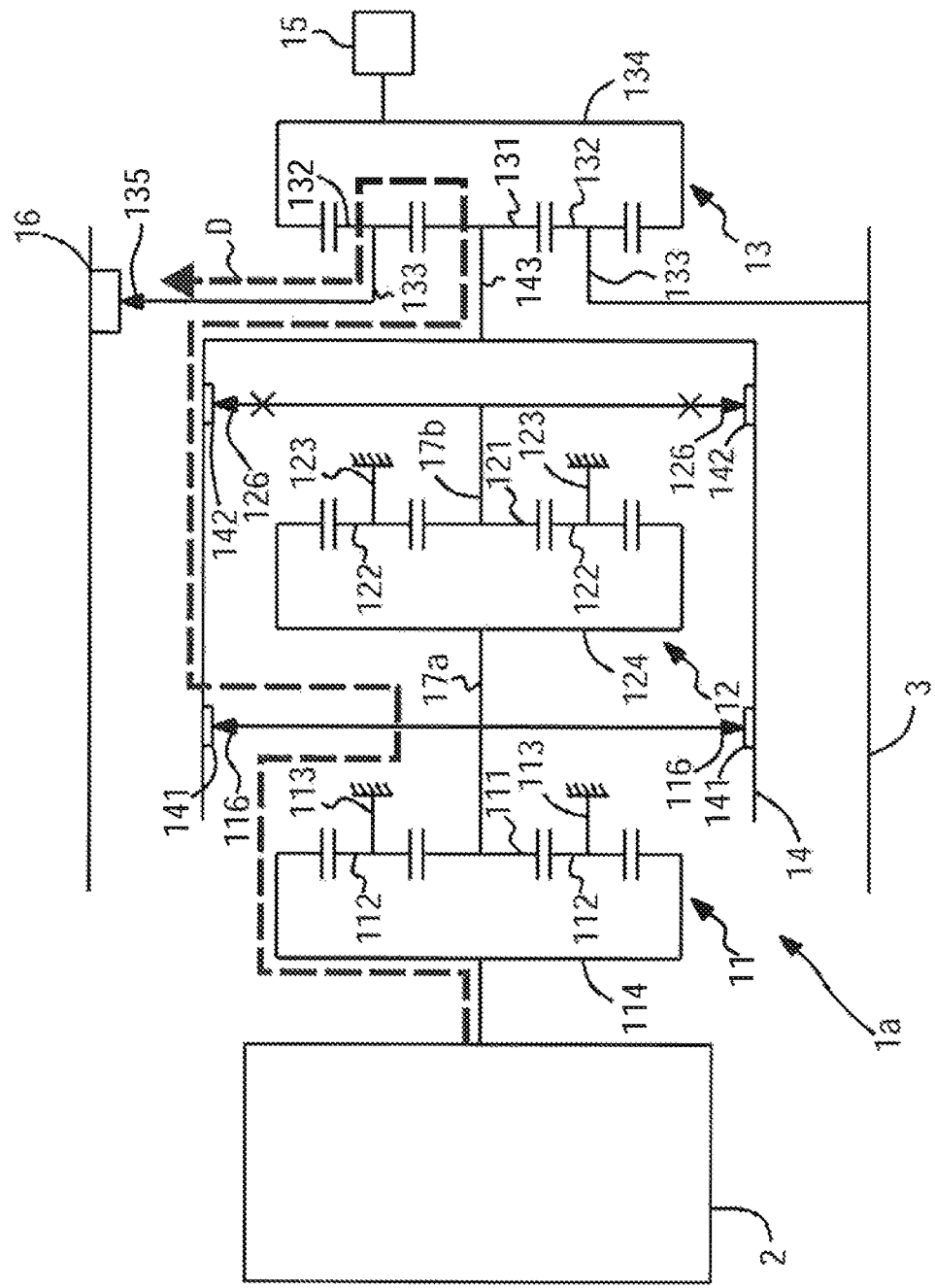
FIG. 8 is a schematic drawing illustrating a second speed increase mode of the motor speed change mechanism of FIG. 6.

The first and second planetary gears sets 11, 12 in the fourth embodiment are drivingly connected so that the first and second sun gears 111, 121, which constitute the first and second outputs, are always driven in opposite rotary directions from the power input 2 so that drive is transmitted to the sleeve ring 14 either through the second clutch plate 116 to provide a first speed increase mode or the first clutch plate 116 to provide a second speed increase or acceleration mode in dependence on the direction of rotation of the power input as illustrated in FIGS. 7 and 8.

The dashed line C in FIG. 7 represents the power transmission path from the power input 2 in a first speed increase mode in which the power input 2 is rotating in a first clockwise direction (symbol "+" represents clockwise rotation and symbol "−" represents counter-clockwise rotation in drawings) to drive the first ring gear 114. Drive from the first ring gear 114 is transmitted through the first planet pinions 112 to the first sun gear 11, which is rotated in a counter-clockwise direction at a higher speed than the first ring gear 114. The coaxial shaft 17a and the first clutch plate 116 are also rotated counter-clockwise together with the first sun gear 111. As the first clutch plate 116 is rotating counter-clockwise, no drive is transmitted from the first clutch plate 116 to the sleeve ring 14 through the first one-way clutch.

The second ring gear 121, is driven in a counter-clockwise direction by the shaft 17a and drive is transferred through the second planet pinions 122 to the second sun gear 121, which is caused to rotate in a clockwise direction and at an increased speed relative to the second ring gear 124. The second coaxial shaft 17b on which the second clutch plate is fixed rotates in clockwise direction together with the second sun gear 121. As the second clutch plate is rotating in a clockwise direction, drive is transmitted from the second clutch plate 126 to the sleeve ring through the second one-way clutch 142 to rotate the sleeve ring 14 in a clockwise direction. Drive is thereafter transmitted from the sleeve ring 14 through the third planetary gear set 13 and the third one-way clutch 16 to the hub shell 3 as in the previous embodiments.

In the first speed increase mode, drive C is transmitted to the sleeve ring 14 through both the first and the second planetary gear sets 11, 12 and thus undergoes a two stage speed increase from the power input to the sleeve ring.

The dashed line D in FIG. 8 represents the power transmission path from the power input 2 in a second speed increase mode in which the power input 2 is rotating in a second, counter-clockwise direction to drive the first ring gear 114. Drive from the first ring gear 114 is transmitted through the first planet pinions 112 to the first sun gear 11, which is rotated in a clockwise direction at a higher speed than the first ring gear 114. The coaxial shaft 17a and the first clutch plate 116 are also rotated clockwise together with the first sun gear 111. As the first clutch plate 116 is rotating clockwise, drive is transmitted from the first clutch plate 116 to the sleeve ring 14 through the first one-way clutch to drive the sleeve ring in a clockwise direction.

The second ring gear 121, is driven in a clockwise direction by the shaft 17a and drive is transferred through the second planet pinions 122 to the second sun gear 121, which is caused to rotate in a counter-clockwise direction and at an increased speed relative to the second ring gear 124. The second coaxial shaft 17b on which the second clutch plate is fixed rotates in a counter-clockwise direction together with the second sun gear 121. As the second clutch plate is rotating in a counter-clockwise direction, no drive is transmitted from the second clutch plate 126 to the sleeve ring through the second one-way clutch. Drive is thereafter transmitted from the sleeve ring 14 through the third planetary gear set 13 and the third one-way clutch 16 to the hub shell 3 as in the previous embodiments.

In the second speed increase mode, drive D is transmitted to the sleeve ring 14 through only the first planetary gear set 11, 12 and thus undergoes a one stage speed increase from the input to the sleeve ring.

In the arrangement shown in FIG. 6, there is an increase in rotational speed and a reduction in torque through each of the first and second planetary gear sets 11, 12, as the sun gears 111, 121 will rotate faster than the ring gears 114, 124. In either of the first and second speed increase modes, the overall gear ratio from the power input 2 to the hub sleeve 3 will also be determined by the gear ratio through the third planetary gear set 13.

The fourth embodiment illustrates how the power line through the first and second planetary gear systems 11, 12 can be arranged in different ways to achieve different gear ratios. What is important is that the first and second planetary gear sets 11, 12 are drivingly coupled so that the first and second outputs are always driven in opposite rotational directions. By coupling the first and second outputs to the sleeve ring 14 through one-way clutch arrangements that are operative to transmit drive only in the same rotary direction, it can be arranged that the sleeve ring 14 is driven by only one of the first and second outputs depending on the direction of rotation of the power input.

In the preferred embodiments described so far, the power transmission path through the third planetary gear set 13 has been the same, with power being input to the third sun gear 113 and output to the hub shell 3 through the third planet pinion carrier 133, whilst the third ring gear 134 is selectively fixed by the electric clutch 15. This need not be the case and the power transmission path through the third planetary gear set 13 can be varied to achieve different gear ratios and/or to change the direction of drive. Table 2 below illustrates the various transmission paths that can be used through the third planetary gear set 13 in any of the embodiments described above.

TABLE 2

Possible configurations for third planetary gear set

| | $3^{rd}$ Ring Gear | $3^{rd}$ Carrier Arm | $3^{rd}$ Sun Gear | Change in Speed |
|---|---|---|---|---|
| 1 | Selectively Fixed | Output | Input | Reduction |
| 2 | Selectively Fixed | Input | Output | Increase |
| 3 | Input | Output | Selectively Fixed | Reduction |
| 4 | Output | Input | Selectively Fixed | Increase |

The electric clutch 15 can be modified to selectively fix any one of the third ring gear 134, the third planet pinion carrier 133 or the third sun gear 131 as appropriate.

The provision of a sleeve ring 14, a third planetary gear set 13 and a third one-way clutch 16 in the drive line between the first and second planetary gear sets 11, 12 and the hub shell 3 is advantageous as it provides an additional speed change ratio, which may be necessary where the required speed change cannot be achieved through a single planetary gear set. Furthermore, use of an electric clutch 15, or other arrangement, to selectively fix the third ring gear 134 (or other fixed component) enables the hub shell 3 to be rotated in a reverse direction without the gear train locking up when power is not being transmitted through the speed change mechanism. This is useful where the speed change mechanism is used in a vehicle such as an electric bicycle where a user may wish to push the bicycle in a reverse direction but adds to the complexity and cost of the mechanism.

Figure 9:
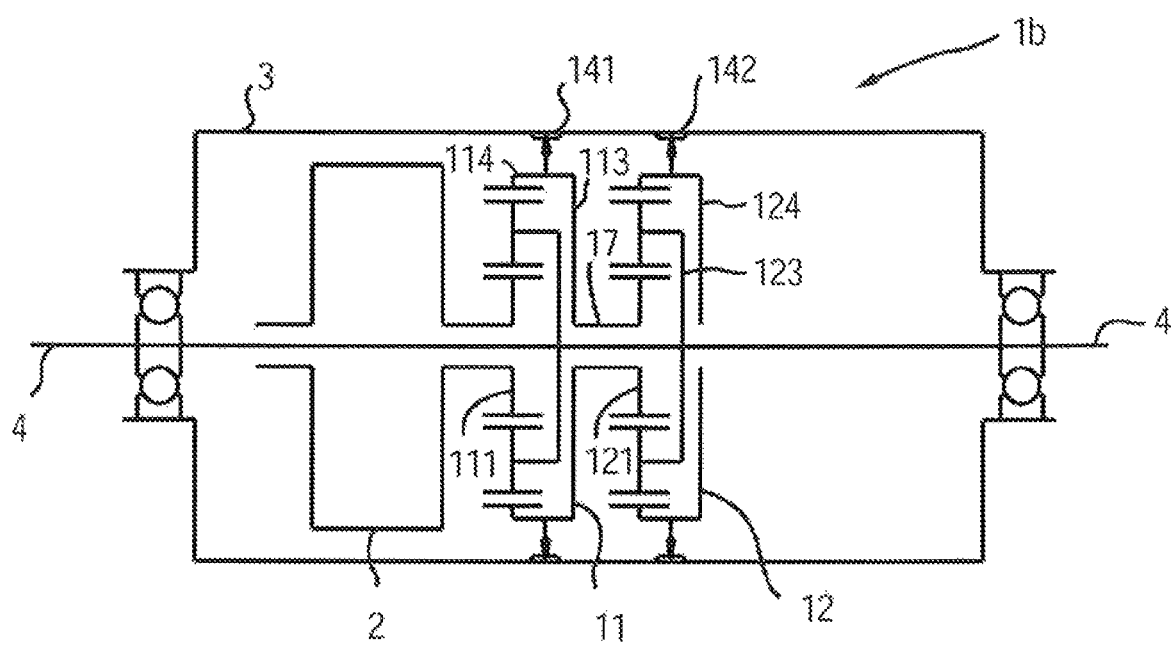
FIG. 9 is a schematic drawing illustrating a motor speed change mechanism in accordance with a fifth embodiment of the present invention.

FIG. 9 illustrates a simplified embodiment of a speed change mechanism 1b in which the third planetary gear set and the electronic clutch are omitted. In this embodiment, the first and second planetary gear sets 11, 12 are located directly within the hub shell 3, which becomes in effect the sleeve ring of the previous embodiments. The first and second outputs, in this case the first and second ring gears 114, 124, are drivingly coupled to the hub shell 3 though respective first and second one-way clutches 141, 142, which are both operative to transmit drive to the hub shell 3 in one and the same direction only.

The speed change mechanism 1b of the fifth embodiment otherwise operates in the same manner as the first embodiment to provided two different speed change ratios to the hub depending on the direction of rotation of the power input 2. However, the hub shell 3 cannot be rotated in a reverse direction as the gears in the planetary gear sets will lock up. Whilst this is less advantageous than the previous embodiments, the arrangement may be acceptable in some applications where the additional costs and complexity of the third planetary gear set and the electronic clutch is not justified. It may be particularly suitable for applications other than electronic vehicles.

As shown in FIG. 9, the power input 2 may be an exterior-rotor DC motor aligned co-axially with the first and second planetary gear sets but the motor could also be offset as shown in FIG. 4. Furthermore, whilst in the embodiment shown in FIG. 9 drive is inputted to each of the first and second planetary gear sets 11, 12 through their respective sun gears 111, 121, and is outputted from their respective ring gears, 114, 124, the reversed arrangement proving two speed increase modes as illustrated in FIGS. 6 to 8 and described above can also be adopted in the simplified embodiment.

Whilst reference has been made to the various components of the speed change mechanism and the power input as rotating either clockwise or counter-clockwise in the descriptions of the preferred embodiments, it will be appreciated that this convention has been adopted for clarity in the description and is not intend to limit the scope of the invent. In practice, the actual direction of rotation of the various components can be selected to suit the requirements of any particular application.

The embodiments described above should not be construed as a limitation on the actual applicable scope of the invention. The protected scope of the invention should cover various modifications and similar arrangements within the spirits of the invention and appended claims. As such, all modifications and alterations without departing from the spirits and scopes of the invention shall be regarded as further embodiments of the invention. In particular, whist the invention has been described in particular with reference to a speed change mechanisms for use in an electronic vehicle to drive a wheel hub, the invention can be applied in other applications, such as in the field of electronic tools, where there is need for a simple and robust speed change mechanism in which different the reduction ratios can be selected by reversing the direction of the input power drive.

Brief description of component representative symbols in the representative drawing of the present invention:

| | |
|---|---|
| 1 | An embodiment of a speed change mechanism |
| 11 | The first planetary gear set |

-continued

Brief description of component representative symbols in the representative drawing of the present invention:

| | |
|---|---|
| 111 | The first sun gear |
| 112 | The first planet pinion |
| 113 | The first carrier arm |
| 114 | The first ring gear |
| 115 | The first ratchet pawl |
| 12 | The second planetary gear set |
| 121 | The second sun gear |
| 122 | The second planet pinion |
| 123 | The second carrier arm |
| 124 | The second ring gear |
| 125 | The second ratchet pawl |
| 13 | The third planetary gear set |
| 131 | The third sun gear |
| 132 | The third planet pinion |
| 133 | The third carrier arm |
| 134 | The third ring gear |
| 135 | The third ratchet pawl |
| 14 | Sleeve ring |
| 141 | The first one-way clutch |
| 142 | The second one-way clutch |
| 143 | Power output |
| 15 | Electric clutch |
| 151 | Fixed block |
| 16 | The third one-way clutch |
| 17 | Coaxial shaft |
| 2 | Power input |
| 3 | Hub shell |
| 4 | Central shaft |
| 21a | Power input main body |
| 22a | Driving gear |
| 23a | Driven gear |
| 1a | A fourth embodiment of a speed change mechanism |
| 1b | A fifth embodiment of a speed change mechanism |

The invention claimed is:

1. A speed change mechanism, comprising:
    a. a first planetary gear set, comprising a first sun gear, a plurality of first planet pinions, a first carrier arm and a first ring gear, wherein one of the first sun gear and the first ring gear comprises a first input and the other of the first sun gear and the first ring gear comprises a first output;
    b. a second planetary gear set, comprising a second sun gear, a plurality of second planet pinions, a second carrier arm and a second ring gear, wherein one of the second sun gear and the second ring gear comprises a second input and the other of the second sun gear and the second ring gear comprises a second output;
    c. a power input connection for drivingly connecting the first input with an output from a power source and a drive arrangement directly coupling the first output to the second input to transfer drive from the first output to the second input, the first and second planetary gear sets being drivingly coupled so that the first and second outputs are driven in opposite rotary directions;
    d. a sleeve ring surrounding the first and second planetary gear sets;
    e. a first one-way clutch for transmitting drive from the first output to the sleeve ring in a first rotary direction only; and
    f. a second one-way clutch for transmitting drive from the second output to the sleeve in the first rotary direction only.

2. A speed change mechanism according to claim 1, wherein the output sleeve ring comprises a hub shell.

3. A speed change mechanism according to claim 1, wherein the output sleeve ring comprises a power output.

4. A speed change mechanism according to claim 3, comprising a hub shell and a third planetary gear set operatively connected between the sleeve ring output and the hub shell to transmit drive from the sleeve ring power output to the hub shell.

5. A speed change mechanism according to claim 4, in which the third planetary gear set comprises: a third sun gear, a plurality of third planet pinions, a third carrier arm and a third ring gear, wherein one of the third sun gear, the third planet pinion carrier and the third ring gear is drivingly connected with the power output of the sleeve ring and first other one of the third sun gear, the third planet pinion carrier and the third ring gear is drivingly coupled to a hub shell to output power to the hub shell.

6. A speed change mechanism according to claim 1, wherein the first input is drivingly connected with a DC electric motor.

7. A speed change mechanism according to claim 1, wherein the first and second inputs are the first and second sun gears respectively and the first and second outputs are the first and second ring gears respectively.

8. A speed change mechanism according to claim 1, wherein the first and second inputs are the first and second ring gears respectively and the first and second outputs are the first and second sun gears respectively.

9. A speed change mechanism according to claim 1, wherein the first and second one way clutches comprise ratchet devices.

10. A speed change mechanism according to claim 9, wherein the sleeve ring has a plurality of ratchet gears disposed about its inner surface and each of the first and second outputs comprises at least one or more ratchet pawls for engagement with the ratchet teeth.

11. A speed change mechanism according to claim 10, in which the first and second ring gear comprise the first and second outputs and wherein each of the first and second ring gears comprises at least one ratchet pawl arranged for engagement with the ratchet teeth.

12. A speed change mechanism according to claim 5, wherein said first other one of the third sun gear, the third planet pinion carrier and the third ring gear is drivingly coupled to the hub shell through a third one-way clutch.

13. A speed change mechanism according to claim 5, further comprising an electric clutch for selectively fixing a second other one of the third sun gear, the third planet pinion carrier and the third ring gear.

14. A speed change mechanism according to claim 13, wherein the electric clutch comprises a solenoid actuator movable from an un-actuated configuration in which said second other one of the third sun gear, the third planet pinion carrier and the third ring gear of the third planetary gear set is not fixed to an actuated configuration in which said second other one of the third sun gear, the third planet pinion carrier and the third ring gear of the third planetary gear set is fixed in response to a predetermined current being inputted.

15. A speed change mechanism according to claim 14, in which the power input is a DC electric motor and wherein the mechanism is configured so that a current is inputted to actuate the solenoid to fix said second other one of the third sun gear, the third planet pinion carrier and the third ring gear of the third planetary gear set only when the motor is being driven.

16. A speed change mechanism for a motor, comprising:
a. a first planetary gear set, comprising a first sun gear, a plurality of first planet pinions, a first carrier arm and a first ring gear;
b. a second planetary gear set, comprising a second sun gear, a plurality of second planet pinions, a second carrier arm and a second ring gear;
c. a third planetary gear set, comprising a third sun gear, a plurality of third planet pinions, a third carrier arm and a third ring gear; and
d. a sleeve ring, the first and second planetary gear sets being located within the sleeve ring and drivingly coupled with the sleeve ring by means of corresponding first and second one-way clutches, the sleeve ring also having a power output;
wherein a power input is connectable with one of the first sun gear and the first ring gear to drive the plurality of first planet pinions fixed by the first carrier arm to drive the other of the first sun gear and the first ring gear, the other of the first sun gear and first ring gear being coupled to drive the sleeve ring through the first one-way clutch, the other of the first sun gear and the first ring gear also being coupled with one of the second sun gear and the second ring gear to drive the second planet pinion fixed by the second carrier arm to drive the other of the second sun gear and the second ring gear, the other of the second sun gear and the second ring gear being coupled to drive the sleeve ring through the second one-way clutch, while the power output of the sleeve ring is connected with one of the third sun gear, the third planet pinion carrier and the third ring gear and a first other one of the third sun gear, the third planet pinion carrier and the third ring gear is drivingly coupled to a hub shell to output power to the hub shell.

17. A speed change mechanism according to claim 16, wherein the power input is a DC electric motor.

18. A speed change mechanism according to claim 16, wherein the first and second one-way clutches are operative to transmit drive to the sleeve ring in the same direction.

19. A speed change mechanism according to claim 18, wherein the first and second one-way clutches are ratchet devices.

20. A speed change mechanism according to claim 16, wherein said first other one of the third sun gear, the third planet pinion carrier and the third ring gear is drivingly coupled to the hub shell through a third one-way clutch.

21. A speed change mechanism according to claim 16, wherein the mechanism comprises an electric clutch for selectively fixing a second other one of the third sun gear, the third planet pinion carrier and the third ring gear.

22. A speed change mechanism according to claim 21, wherein the electric clutch is a normally open solenoid, the solenoid being movable axially to fix said second other one of the third sun gear, the third planet pinion carrier and the third ring gear in response to a predetermined current being inputted.

23. A speed change mechanism according to claim 22, in which the power input is a DC electric motor and wherein the mechanism comprises a control system operative to actuate the solenoid to fix said second other one of the third sun gear, the third planet pinion carrier and the third ring gear only when the motor is being driven.

24. A method of operating a speed change mechanism for a motor according to claim 1, the method comprising driving the first input in a first rotary direction so as to transfer drive to the sleeve ring from one of the first and second outputs through its respective one-way clutch to achieve a first speed change ratio and subsequently driving the first input in the opposite rotary direction so as to transfer drive to the sleeve ring from the other of the first and second outputs through its respective one-way clutch to achieve a second speed change ratio.

25. A method according to claim 24, in which the power input is a DC electric motor, wherein the step of changing the direction in which the first input is driven is carried out by reversing the polarity of a current supplied to the electric motor.

* * * * *